(12) United States Patent
Weimer

(10) Patent No.: US 11,340,914 B2
(45) Date of Patent: May 24, 2022

(54) RUN-TIME IDENTIFICATION OF DEPENDENCIES DURING DYNAMIC LINKING

(71) Applicant: Red Hat, Inc., Raleigh, NC (US)

(72) Inventor: Florian Weimer, Stuttgart (DE)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/076,485

(22) Filed: Oct. 21, 2020

(65) Prior Publication Data

US 2022/0121457 A1   Apr. 21, 2022

(51) Int. Cl.
*G06F 9/44* (2018.01)
*G06F 9/445* (2018.01)
*G06F 8/41* (2018.01)

(52) U.S. Cl.
CPC .......... *G06F 9/44521* (2013.01); *G06F 8/433* (2013.01)

(58) Field of Classification Search
CPC .............................. G06F 9/44521; G06F 8/433
USPC ......................................................... 717/164
See application file for complete search history.

(56) References Cited

U.S. PATENT DOCUMENTS

| | | | | |
|---|---|---|---|---|
| 7,316,010 B1* | 1/2008 | Daynes | ............... | G06F 9/445 717/140 |
| 7,412,710 B2* | 8/2008 | Oliva | ............... | G06F 9/44521 718/104 |
| 7,665,075 B1* | 2/2010 | Daynes | ............... | G06F 9/445 717/148 |
| 7,900,199 B2* | 3/2011 | Gassoway | ............... | G06F 9/4486 717/164 |
| 7,937,564 B1* | 5/2011 | Ashcraft | ............... | G06F 9/30181 712/216 |
| 8,434,099 B2* | 4/2013 | Forin | ............... | G06F 9/4411 719/331 |
| 9,355,029 B2* | 5/2016 | Moser | ............... | G06F 12/023 |
| 9,552,206 B2* | 1/2017 | Johnson | ............... | G06F 9/30076 |
| 2004/0255273 A1* | 12/2004 | Chan | ............... | G06F 9/44521 717/120 |
| 2006/0080681 A1* | 4/2006 | Anwar | ............... | G06F 9/44547 719/331 |
| 2006/0080682 A1 | 4/2006 | Anwar et al. | | |

(Continued)

OTHER PUBLICATIONS

Run-time dynamic linking for reprogramming wireless sensor networks, author: A Dunkels etal, published on 2006, source: ACM org.*

(Continued)

*Primary Examiner* — Chameli Das
(74) *Attorney, Agent, or Firm* — Withrow & Terranova, PLLC

(57) ABSTRACT

Run-time identification of dependencies during dynamic linking. A dynamic linker accesses contents of a first executable file that is to be executed. The dynamic linker, based on the contents of the first executable file, determines that the first executable file includes a first dynamic dependency function configured to be executed by the dynamic linker. The dynamic linker invokes the first dynamic dependency function of the first executable file. The dynamic linker receives, from the first dynamic dependency function, a first run-time dependency identifier that identifies a first run-time dependency, and adds the first run-time dependency identifier to a dependency identifier list.

20 Claims, 10 Drawing Sheets

(56) References Cited

U.S. PATENT DOCUMENTS

| | | | | |
|---|---|---|---|---|
| 2006/0125660 | A1* | 6/2006 | Jegou | H03M 13/39 341/50 |
| 2007/0234002 | A1* | 10/2007 | Litke | G06F 12/10 711/202 |
| 2011/0231440 | A1* | 9/2011 | Vlaovic | G06F 8/71 707/769 |
| 2011/0258619 | A1* | 10/2011 | Wookey | G06F 8/658 717/175 |
| 2011/0276674 | A1* | 11/2011 | Jensen-Horne | H04L 41/5054 709/223 |
| 2014/0165048 | A1* | 6/2014 | Meirowitz | G06F 9/44521 717/153 |
| 2017/0090889 | A1* | 3/2017 | Hale | G06F 8/433 |
| 2017/0228155 | A1* | 8/2017 | Shirota | G06F 3/0655 |
| 2017/0371595 | A1* | 12/2017 | De | G06F 3/0638 |
| 2018/0314531 | A1* | 11/2018 | Rhodes | G06F 9/4492 |
| 2019/0108448 | A1* | 4/2019 | O'Malia | G06N 3/04 |
| 2020/0076701 | A1* | 3/2020 | Gershaft | H04L 41/145 |
| 2020/0117483 | A1* | 4/2020 | Greenfield | G06F 9/44521 |
| 2021/0049050 | A1* | 2/2021 | Goodwin | G06F 9/4881 |

OTHER PUBLICATIONS

The inside story on shared libraries and dynamic loading, source: IEEE author: DM Beazley et al., published on 2001.*

Title: Prioritizing change-impact analysis via semantic program-dependence quantification, author: H Cai,, published on 2015.*

Title: Dynamic integration test selection based on test case dependencies, author: Sahar Tahvilli, published on 2016.*

Title: Dynamic linking and loading in networked embedded systems, author: W Dong, published on 2009.*

Title: Ddl: Extending dynamic linking for program customization, analysis, and evolution, author: Sumant Tambe et al., published on 2005.*

Author Unknown, "Dynamic Linking," The Santa Cruz Operation, Inc., https://refspecs.linuxbase.org/elf/gabi4+/ch5.dynamic.html, accessed Sep. 1, 2020, 13 pages.

Author Unknown, "Chapters Runtime Linker," Oracle Corporation, https://docs.oracle.com/cd/E19683-01/817-1983/6mhm6r4em/index.html, accessed Sep. 1, 2020, 30 pages.

Author Unknown, "Audit Interface Functions," Runtime Linker Auditing Interface—Oracle® Solaris 11.3 Linkers and Libraries Guide, https://docs.oracle.eom/cd/E53394_01/html/E54813/man-rlai.html#OSLLGchapter6-1246, accessed Oct. 21, 2020, 5 pages.

Author Unknown, "6.33.1 Common Function Attributes," Common Function Attributes (Using the GNU Compiler Collection (GCC)), https://gcc.gnu.org/onlinedocs/gcc-10.2.0/gcc/Common-Function-Attributes.html#Common-Function-Attributes#index-target-function-attribute, accessed Oct. 21, 2020,18 pages.

Author Unknown, "Dynamic Linking," www.sco.com/developers/gabi/latest/ch5.dynamic.html, accessed Oct. 21, 2020, 13 pages.

Author Unknown, "What is an indirect function (IFUNC)?," https://sourceware.org/glibc/wiki/GNU_IFUNC, accessed Oct. 21, 2020, 3 pages.

* cited by examiner

RUN-TIME IDENTIFICATION OF DEPENDENCIES DURING DYNAMIC LINKING

BACKGROUND

A dynamic linker is invoked, typically by an operating system, to load dependencies identified in an executable file that is in the process of being initiated. The dynamic linker accesses the content of the executable file to determine the identity of the dependency, loads the dependency into memory, and maps unresolved symbols in the executable to matching symbols in the dependency. After the dynamic linker is finished, the executable begins executing at an entry point of the executable.

SUMMARY

The examples disclosed herein implement run-time identification of dependencies during dynamic linking. In particular, the examples allow an executable to identify, during a dynamic linking process, which dependencies are to be used by the dynamic linker.

In one implementation a method is provided. The method includes accessing, by a dynamic linker executing on a computing device comprising a processor device, contents of a first executable file that is to be executed. The method further includes determining, by the dynamic linker, based on the contents of the first executable file, that the first executable file includes a first dynamic dependency function configured to be executed by the dynamic linker. The method further includes invoking, by the dynamic linker, the first dynamic dependency function of the first executable file. The method further includes receiving, by the dynamic linker from the first dynamic dependency function, a first run-time dependency identifier that identifies a first run-time dependency. The method further includes adding the first run-time dependency identifier to a dependency identifier list.

In another example a computing device is provided. The computing device includes a memory and a processor device coupled to the memory. The processor device is to access, by a dynamic linker, a first executable file that is to be executed. The processor device is further to determine, by the dynamic linker, based on the first executable file, that the first executable file includes a first dynamic dependency function. The processor device is further to invoke, by the dynamic linker, the first dynamic dependency function. The processor device is further to receive, by the dynamic linker from the first dynamic dependency function, a first run-time dependency identifier that identifies a first run-time dependency. The processor device is further to add the first run-time dependency identifier to a dependency identifier list.

In another example a non-transitory computer-readable storage medium that includes executable instructions is provided. The executable instructions cause a processor device to access, by a dynamic linker, a first executable file that is to be executed. The executable instructions further cause the processor device to determine, by the dynamic linker, that the first executable file includes a first dynamic dependency function. The executable instructions further cause the processor device to invoke, by the dynamic linker, the first dynamic dependency function. The executable instructions further cause the processor device to receive, by the dynamic linker from the first dynamic dependency function, a first run-time dependency identifier that identifies a first run-time dependency. The executable instructions further cause the processor device to add the first run-time dependency identifier to a dependency identifier list.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
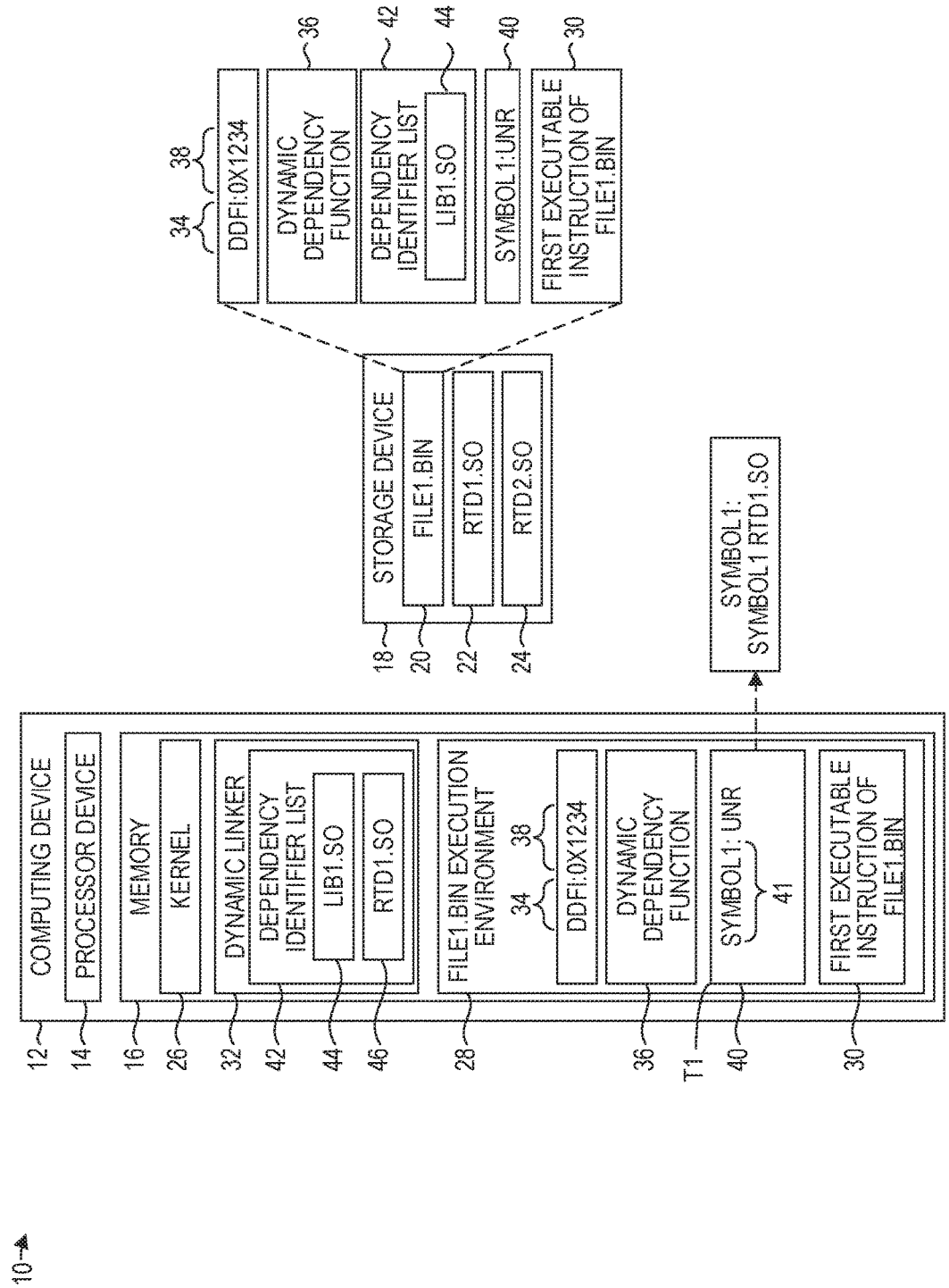
FIG. 1 is a block diagram of an environment in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

A dynamic linker is invoked, typically by an operating system, to load dependencies identified in an executable file that is in the process of being initiated. The dynamic linker accesses the content of the executable file to determine the identity of the dependency, loads the dependency into memory, and maps unresolved symbols in the executable to matching symbols in the dependency. After the dynamic linker is finished, the executable begins executing at an entry point of the executable.

There are situations in which it would be desirable for an executable to be linked to a particular version of a dependency, such as a shared library, based on characteristics of the computing device environment in which the dependency will execute. For example, a particular model of processor device may implement improved features that are not implemented by other processor device models, which improve performance of a dependency if the dependency is developed and/or compiled to take advantage of such features. However, the executable that utilizes the dependency may operate in multiple different computing device environments, only some of which utilize the processor device that is capable of implementing the improved features. Thus, in some environments it would be desirable for the executable to link to the improved dependency, and in other environments the executable would have to link to the dependency without the improved features.

The examples disclosed herein implement run-time identification of dependencies during dynamic linking. In particular, the examples allow an executable to identify, during a dynamic linking process, which dependencies are to be used by the dynamic linker for symbol-matching purposes. Specifically, the examples implement a new dynamic dependency function indicator that indicates, to a dynamic linker, that the executable contains a dynamic dependency function. The dynamic linker invokes the dynamic dependency function, and the dynamic dependency function provides the dynamic linker one or more dependency identifiers that identify corresponding dependencies. The dynamic linker then utilizes the dependencies during a symbol matching stage to map unresolved symbols in the executable to symbols in the identified dependencies.

The dynamic linker may provide to the dynamic dependency function environment information that identifies attributes of a computing device environment on which the dynamic dependency function is executing. The dynamic dependency function may also be able to obtain, via operating system calls, environment information that identifies attributes of the computing device environment. Based on the environment information, the dynamic dependency function may identify a particular subset of dependencies from a set of dependencies, and provide the subset of dependencies to the dynamic linker.

FIG. 1 is a block diagram of an environment 10 in which examples may be practiced. The environment 10 includes a computing device 12, which in turn includes a processor device 14 and a memory 16. The computing device 12 includes, or is otherwise communicatively coupled to, a storage device 18. The storage device 18 contains a number of executable files 20, 22 and 24. Each of the executable files 20, 22 and 24 contain binary executable instructions which, when processed by the processor device 14, cause the processor device 14 to implement a particular function.

The executable files 20, 22 and 24 may be in any suitable executable format, such as, by way of non-limiting example, an executable and linkable format (ELF), a portable executable (PE) format, a Mach object file (Mach-O) format, a DOS MZ format, a WebAssembly/WASM format, or the like. In this example, the executable files 22 and 24 are shared libraries that can be linked into another executable at runtime by a dynamic linker, as opposed to being linked at compile time. Because the executable files 22 and 24 are shared libraries on which other executables depend, the executable files 22 and 24 are dependencies, and are sometimes referred to herein as dependencies 22 and 24, or run-time dependencies 22 and 24, respectively.

The memory 16 includes an operating system, referred to herein as a kernel 26, which may comprise any suitable operating system, such as, by way of non-limiting example, Linux®, Windows®, macOS®, Android®, iOS® or the like. In response to an event, such as an implicit or explicit request from a user or a program, the kernel 26 determines that the executable file 20 is to be initiated and executed. As part of the initiation process, the kernel 26 establishes, in the memory 16, an execution environment 28, sometimes referred to herein as the "executable," for the executable file 20. The execution environment 28 typically includes the executable instructions of the executable file 20, a symbol table that identifies unresolved symbols contained in the executable instructions, a header portion that identifies wherein the executable file 20 the executable instructions and symbol table are located, and additional information ultimately necessary for the execution of the executable file 20. The content and format of the execution environment 28 may differ depending on the format of the executable and the particular kernel 26. In some implementations, the execution environment 28 may be referred to as a process or process environment.

The initiation process, as the term is used herein, refers to a period of time that the execution environment 28 is being setup so that the executable file 20 can successfully execute. The executable file 20 contains information that identifies a first executable instruction 30 of the executable file 20, which will be executed by the processor device 14 when the initiation process is complete. At some point in the initiation process, the kernel 26 determines that the executable file 20 includes a run-time dependency. In this implementation, the kernel 26 transfers the initiation process to a dynamic linker 32 to handle the run-time dependency processing. While solely for purposes of illustration the dynamic linker 32 is illustrated as a separate component from the kernel 26, in other implementations, the dynamic linker 32 may be a function of the kernel 26 that is integrated into the kernel 26. In some implementations, the dynamic linker 32 may be part of the execution environment 28. In a Linux implementation, by way of non-limiting example, the dynamic linker 32 may comprise ld.so.1, ld.so.2, or ld-linux.so.2, modified to include the functionality described herein.

The executable file 20 includes a dynamic dependency function indicator (DDFI) 34 which indicates the presence, in the executable file 20, of a dynamic dependency function 36. The executable file 20 also includes a dynamic dependency function address 38 which identifies a location of the dynamic dependency function 36 in the executable file 20. The executable file 20 may include a data structure 40 that identifies unresolved symbols of the executable file 20. An unresolved symbol comprises a reference to another executable, such as a shared library, such as the executable file 22 or the executable file 24. The symbol could be expressed as an ordinal number, or a textual descriptor for example. The particular format of a symbol may differ depending on the operating system and/or the programming language. In this example, at a time T1, the data structure 40 identifies a symbol 41 as unresolved. The executable file 20 also includes a dependency identifier list 42 of dependencies, such as libraries. In this example, the dependency identifier list 42 identifies a dependency 44.

The executable file 20 is generated based on one or more source code files that contain programming instructions that are typically in a non-binary form. A compiler or interpreter accesses the source code files and generates the executable file 20. In this implementation, the compiler or interpreter has been modified to recognize instructions that identify the existence of the dynamic dependency function 36, and to generate, in response to the existence of the dynamic dependency function 36, the DDFI 34 and the dynamic dependency function address 38. Some or all of the contents of the executable file 20 are copied into the execution environment 28 by the kernel 26, the dynamic linker 32, or a combination of the two. While for purposes of illustration the contents of the executable file 20 are illustrated in the execution environment 28 in a same relative location and format as arranged in the executable file 20 as stored on the storage device 18, in practice, the contents of the executable file 20 may be re-arranged as they are relocated to the execution environment 28. Addresses identified in the executable file 20 may be replaced in the execution environment 28 with logical addresses that ultimately resolve to an actual address.

The dynamic linker 32 accesses the contents of the executable file 20, either the contents stored on the storage device 18 or those in the execution environment 28, and begins a process of generating, or in this example, modifying, the dependency identifier list 42 that identifies dependencies that will facilitate symbol mapping, as discussed in greater detail below. In this implementation, the executable file 20 contains one static dependency ("LIB1.SO") identified by the dependency identifier 44 in the dependency identifier list 42. The dynamic linker 32 then determines, based on the DDFI 34, that the executable file 20 contains the dynamic dependency function 36. The dynamic linker 32, based on the dynamic dependency function address 38, invokes or otherwise initiates the dynamic dependency function 36. The dynamic dependency function 36 executes, and based on one or more criteria, determines to return to the dynamic linker 32 a dependency identifier 46 that identifies the executable file 22 rather than the executable file 24.

Example criteria that may be used by the dynamic dependency function 36 will be discussed in greater detail below. As an example, the executable file 22 may be a shared library that contains executable code generated for a particular processor model that can implement features which improve performance of the executable file 22, and which are not implemented by other processor device manufacturers. The executable file 24 is also a shared library that implements the same functionality as the executable file 22 but that does not contain the executable code generated for the particular processor model. Each of the executable files 22 and 24 contain the same symbols. The dynamic dependency function 36 may access information that identifies the processor device 14 as a processor device that implements such features, and in response, the dynamic dependency function 36 returns the dependency identifier 46 to identify the executable file 22 rather than the executable file 24. The dynamic dependency function 36 then terminates.

The dynamic linker 32 adds the dependency identifier 46 to the dependency identifier list 42. In this example, the dynamic linker 32 encounters no more dependencies and enters a symbol matching stage. The dynamic linker 32 subsequently loads the executable file 22 (not illustrated) and determines that the executable file 22 contains a symbol that matches the unresolved symbol 41. The dynamic linker 32 then resolves the unresolved symbol 41 by mapping the unresolved symbol 41 to the symbol in the executable file 22 at a time T2.

In this example, the compiler or interpreter that generated the executable file 20 may be configured to allow symbols to be utilized that are not identified as existing in any particular dependency if the source code contains a dynamic dependency function, or if the declaration of the symbol follows a predetermined syntax that informs the compiler that the symbol will be resolved only after the dynamic dependency function 36 has executed.

In some implementations, the dynamic linker 32 may give dependencies identified by the dynamic dependency function 36 a higher symbol matching priority than static dependencies. Thus, the dynamic linker 32 may, during symbol matching, first search the dependency 22 for a symbol that matches the unresolved symbol 41 rather than the dependency identified by the dependency identifier 44. In such implementation, the dependency 22 may override symbols of the dependency identified by the dependency identifier 44. As an example, the executable file 22 may invoke a function_1 of the dependency identified by the dependency identifier 44. However, the dependency 22 may contain a function_1, and due to the higher symbol-matching priority, the dynamic linker 32 may map the unresolved symbol 41 to the function_1 of the dependency 22 instead of the function_1 in the dependency identified by the dependency identifier 44.

After the dynamic linker 32 finishes processing, the dynamic linker 32 transfers control, and the processor device 14 begins execution of the executable file 20 via the first executable instruction 30.

It is noted that because the dynamic linker 32 is a component of the computing device 12, functionality implemented by the dynamic linker 32 may be attributed to the computing device 12 generally. Moreover, in examples where the dynamic linker 32 comprises software instructions that program the processor device 14 to carry out functionality discussed herein, functionality implemented by the dynamic linker 32 may be attributed herein to the processor device 14.

Figure 2:
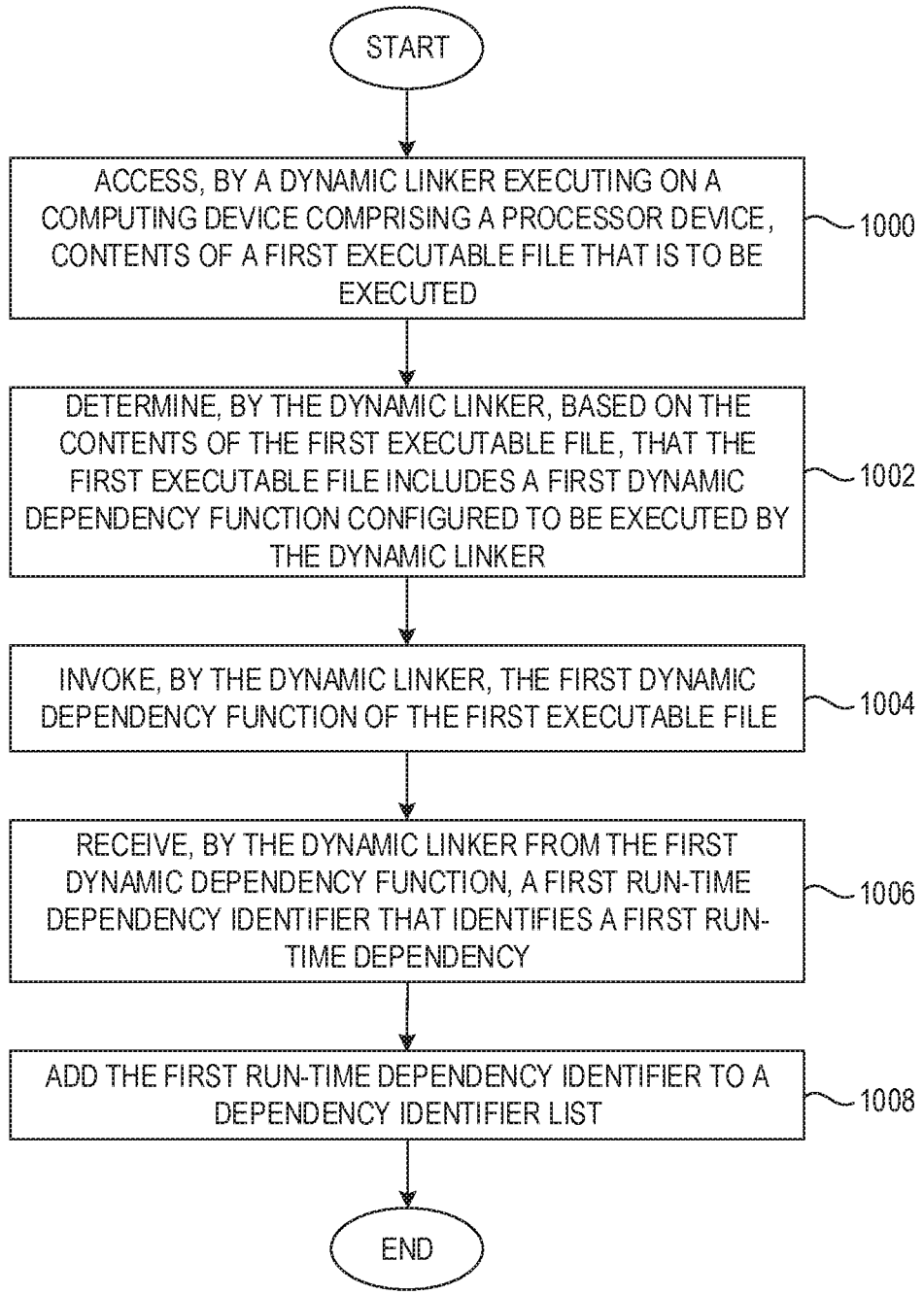
FIG. 2 is a flowchart of a method for run-time identification of dependencies during dynamic linking according to one example.

FIG. 2 is a flowchart of a method for run-time identification of dependencies during dynamic linking according to one example. FIG. 2 will be discussed in conjunction with FIG. 1. The dynamic linker 32, executing on the computing device 12 comprising the processor device 14, accesses contents of the executable file 20 that is to be executed (FIG. 2, block 1000). The dynamic linker 32 determines, based on the contents of the executable file 20, that the executable file 20 includes the dynamic dependency function 36 configured to be executed by the dynamic linker 32 (FIG. 2, block 1002). The dynamic linker 32 invokes the dynamic dependency function 36 of the executable file 20 (FIG. 2, block 1004). The dynamic linker 32 receives, from the dynamic dependency function 36, the run-time dependency identifier 46 that identifies the run-time dependency 22 (FIG. 2, block 1006). The dynamic linker 32 adds the run-time dependency identifier 44 to the dependency identifier list 42 (FIG. 2, block 1008).

Figure 3A:
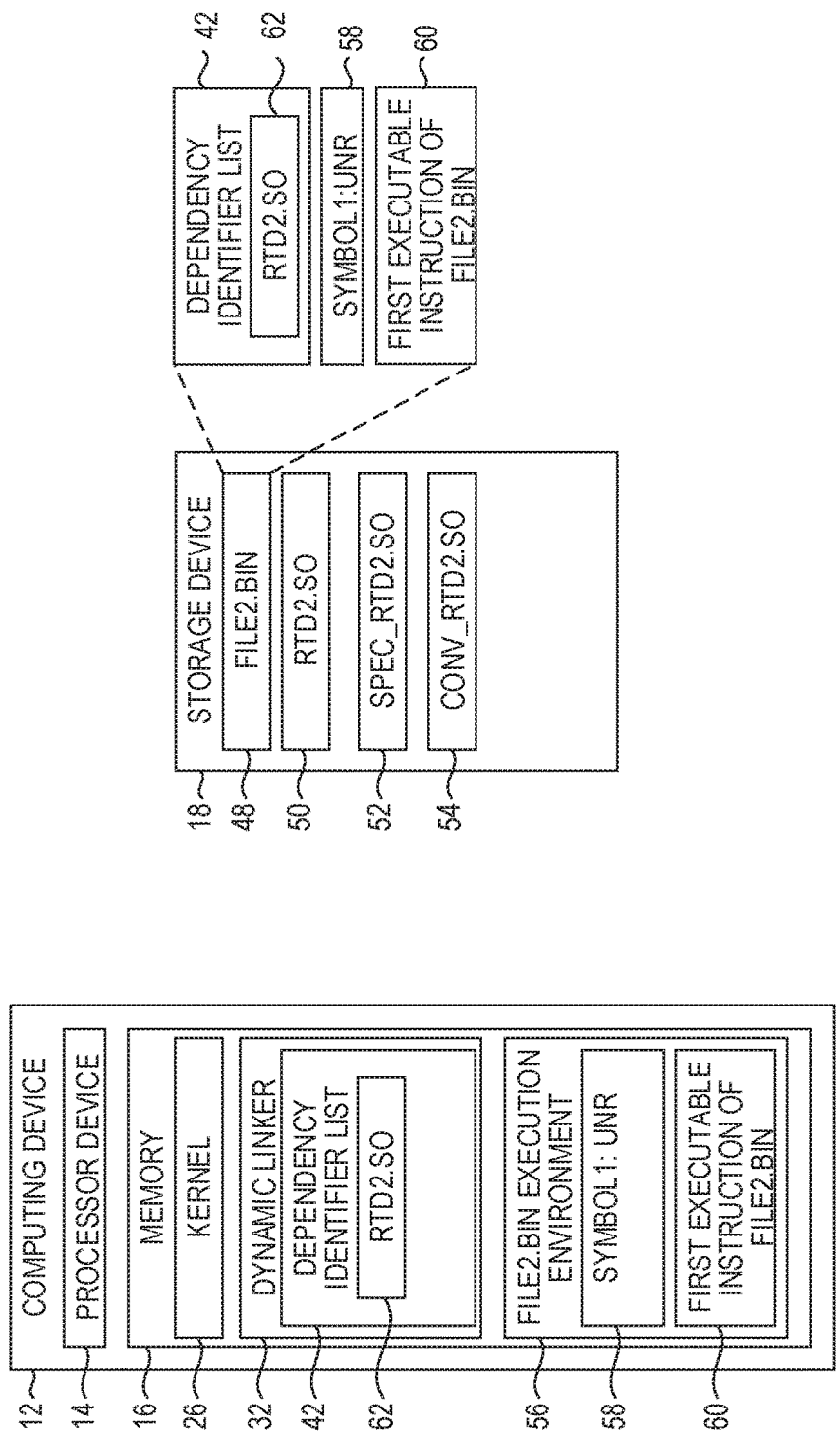
FIGS. 3A-3B illustrate the environment illustrated in FIG. 1 according to a different implementation, at different points in time.
Figure 3B:
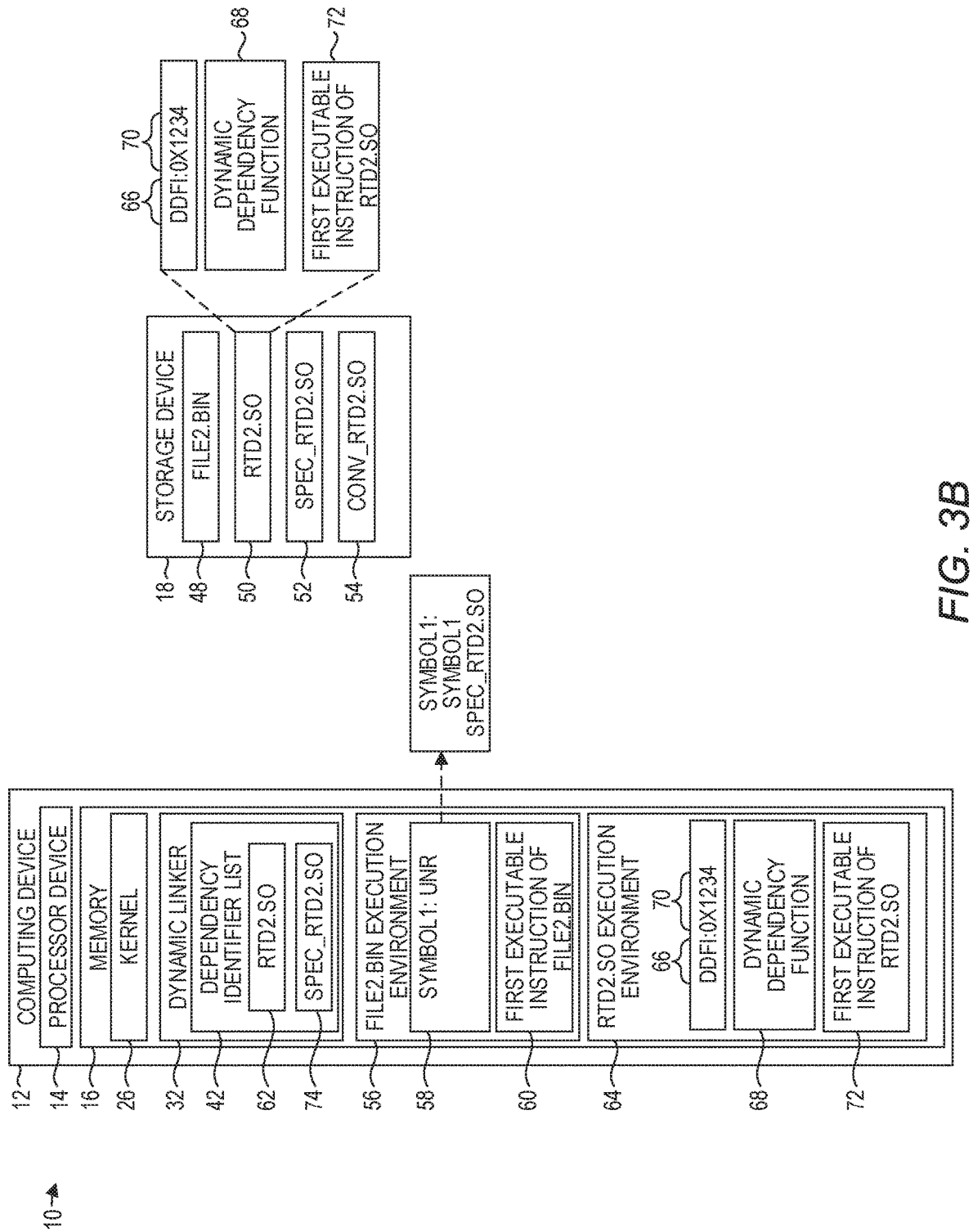

FIGS. 3A-3B illustrate the environment 10 according to a different implementation, at different points in time. In this implementation, the storage device 18 includes executable files 48, 50, 52 and 54. Each of the files 48, 50, 52 and 54 contain binary executable instructions which, when processed by the processor device 14, cause the processor device 14 to implement a particular functionality. In this implementation, the files 48, 50, 52 and 54 are ELF files. As will be described in greater detail below, the file 48 does not contain a dynamic dependency function, and the file 50 is a shared library to which the file 48 is dynamically linked. The file 50 does contain a dynamic dependency function and, based on one or more criteria, returns to the dynamic linker 32 either the file 52 as a dependency, or the file 54 as a dependency.

As will be discussed below, the file 48 references a SYMBOL1 that will be resolved at runtime. Typically, when a symbol in a source code file is implemented in a shared object that will be linked at runtime, the compiler accesses the shared object at compile time to ensure the shared object implements the referenced symbol. Thus, at compile time, the compiler that generated the file 48 was provided access to a shared object that implemented SYMBOL1. However, at runtime, as illustrated in FIGS. 3A and 3B, the file 50 is provided in lieu of the file that was utilized at compile time.

In response to an event, such as an implicit or explicit request from a user or a program, the kernel 26 determines that the file 48 is to be initiated and executed. As part of the initiation process, the kernel 26 establishes, in the memory 16, an execution environment 56 for the file 48. Some or all of the contents of the file 48 are copied into an execution environment 56. In this example, the execution environment 56 includes a data structure 58, which identifies unresolved symbols of the file 48, a dependency identifier list 42 that contains a dependency identifier 62, and executable instructions 60, which include a first executable instruction that the processor device 14 will execute after the initiation stage completes. The data structure 58 identifies a function "SYMBOL 1" as being unresolved. Note that the file 48 does not include a DDFI or a dynamic dependency function. The symbol "SYMBOL 1" is unresolved because the file 50 is a shared library, and an address of the symbol "SYMBOL 1" will be determined at runtime.

The dynamic linker 32 accesses the dependency identifier list 42 and begins loading the identified dependencies, in this example, the dependency identified by the dependency identifier 62, for symbol mapping during the symbol mapping phase of the initiation stage.

Referring now to FIG. 3B, the dynamic linker 32 loads the file 50 to load symbols of the file 50 for subsequent symbol matching. An execution environment 64 is generated for the file 50, and some or all of the contents of the file 50 are copied into the execution environment 64. In this example, the file 50 includes a DDFI 66 that indicates the presence of a dynamic dependency function 68. The file 50 also includes a dynamic dependency function address 70, which identifies a location of the dynamic dependency function 68, and executable instructions 72 that include a first executable instruction that the processor device 14 will execute after the initiation stage of the file 50 completes.

The dynamic linker 32 determines, based on the DDFI 66, that the file 50 contains the dynamic dependency function 68. In an ELF file implementation, the DDFI 66 may be a tag, such as, by way of non-limiting example, DT_DDF, located in a dynamic segment of the file 50, which is located based on a PT_DYNAMIC element in the program file header. Thus, the dynamic linker 32 may access the PT_DYNAMIC element in the program file header to determine the location of the dynamic segment, access the dynamic segment, and identify the DT_DDF tag to determine that the file 50 contains the dynamic dependency function 68.

In some implementations, the execution capabilities of the dynamic dependency function 68 may be limited since symbol mapping has not yet been performed, and the dynamic dependency function 68 may not be able to contain any relocation dependencies. One such limitation may be an inability to allocate additional memory. In such implementations, the dynamic linker 32 may, prior to invoking the dynamic dependency function 68, allocate a quantity of memory and provide a pointer to an initial address of the memory to the dynamic dependency function 68 when the dynamic linker 32 invokes the dynamic dependency function 68.

The dynamic dependency function 68 may make a determination to return the executable file 22 as a dependency or the executable file 24 as a dependency based on environment information that identifies attributes of the computing device environment on which the dynamic dependency function 68 is executing. The dynamic dependency function 68 may be able to invoke certain functions of the kernel 26, such as, by way of non-limiting example, getpagesize, to obtain certain environment information. The dynamic dependency function 68 may utilize file system access using kernel facilities to discover system properties. Other environment information may be provided to the dynamic dependency function 68 by the dynamic linker 32. Environment information that may be passed to the dynamic dependency function 68 by the dynamic linker 32 or otherwise obtained by the dynamic dependency function 68 may include:

A) a process auxiliary vector of the execution environment 64 that includes one or more of:
   1) platform name (name identifying the processor architecture level, e.g. "power10") of the processor device 14 and/or other processor device information that identifies characteristics of the processor device 14, such as the model number, supported instruction sets, or the like;
   2) hardware capability flags (HWCAPs):
      whether the CPU supports vector instructions (potentially for several different generations of vector instructions);
      whether the CPU supports compare-and-swap atomic instructions in addition to load-exclusive/store-exclusive accesses;
      whether the CPU supports an enlarged register file;
      the vector register width preferred by the CPU; and
      whether the CPU needs workarounds for certain defects (e.g., avoiding certain instructions next to a cache line boundary);
   3) information describing the cache hierarchy:
      cache line size;
      cache associativity; and
      cache size, for various cache levels and kinds (instruction and data caches); and
   4) whether the process underwent a security transition when it was launched (e.g. SUID/SGID flag, SELinux transition);
B) a process environment vector of the execution environment 64 that includes environment variables that can be set by a user or programmatically set and used by the dynamic dependency function 68 as a criterion;
C) the file system path of the file 50;
D) the file system path of the file 48;
E) additional information such as:
   whether debugging mode is active and which kind (e.g., valgrind, Address Sanitizer, Thread Sanitizer);
   whether run-time profiling mode is active;
   whether the system is in FIPS 140-2 mode or not;
   CPU core, thread and socket count; CPU cache sizes and other information related to the cache hierarchy;

whether the system is running under virtualization or nested virtualization;

whether the process is running in a container;

whether the system has been configured to optimize for power/battery life or throughput;

the operating system version;

the presence of accelerator devices (GPGPUs, FGPAs) and their properties; and licensing/subscription state of the system (i.e., free tier vs. paid tier).

It will be apparent that these are merely examples of the environment information that could be provided to the dynamic dependency function 68 or otherwise obtained by the dynamic dependency function 68 to make a determination to return the file 52 as a dependency or to return the file 54 as a dependency.

Based on one or more items of environment information, the dynamic dependency function 68 determines to return a dependency identifier that identifies the file 52 rather than the file 54. The dynamic dependency function 68 determines that the amount of memory allocated by the dynamic linker 32 is insufficient to hold the dependency identifier that identifies the file 52. The dynamic dependency function 68 returns a value to the dynamic linker 32 indicating that the amount of memory is insufficient. In some implementations, the dynamic dependency function 68 may also provide a desired amount of memory to be allocated. The dynamic linker 32 allocates a second, larger quantity of memory and invokes the dynamic dependency function 68 again, passing the pointer to an initial memory address of the larger quantity of memory and providing the dynamic dependency function 68 any suitable environment information, as discussed above. The dynamic dependency function 68 copies the identifier of the file 52 into the allocated memory via the pointer, and terminates.

The dynamic linker 32 accesses the allocated memory and adds a dependency identifier 74 to the dependency identifier list 42 that identifies the dependency. In the subsequent symbol matching stage, the dynamic linker 32 determines that the symbol "SYMBOL1" is not actually defined in the file 50, but is defined in the file 52, and thus matches the "SYMBOL1" to a matching symbol in the file 52. Subsequent to symbol matching, the dynamic linker 32 returns control such that the processor device 14 executes the first executable instruction of the file 48.

The implementation described in FIGS. 3A and 3B provide a mechanism for providing enhanced functionality to executable files that utilize shared objects without a need to modify, revise or test such executable files. In particular, many executable files contain one or more commonly used dependencies, such as shared objects that implement commonly-used functions. As an illustration, assume that a commonly used shared object is referred to as "RTD2.SO", and is routinely included in a large number of applications that execute on the computing device 12. Assume that the processor device 14 implements improved features not available on all processor devices such that if a program, such as a shared library, has been developed to utilize the improved features, or re-compiled to implement the improved features, the shared library provides an advantage in efficiency over other processor devices. However, a shared library that has been developed to utilize the improved features cannot execute on a processor device that does not offer such improved features. Assume further that the shared object "RTD2.SO" is accessed by many computing devices 12, some of which contain a processor device that implements the improved features, and some of which contain a processor device that does not.

Two versions of the shared object are generated: the file 52, which has been modified and/or recompiled to take advantage of the improved features of the processor device, and the file 54, which has not, and thus is suitable for execution on computing devices that do not have such a processor device. The file 50 is developed essentially as a "shell" that contains little more than the dynamic dependency function 68. The file 50 may be titled "RTD2.SO". As an executable file is initiated, the dynamic linker 32 accesses the file 50. As discussed above, the dynamic linker 32 invokes the dynamic dependency function 68. The dynamic dependency function 68 utilizes the environment information to determine whether the processor device 14 implements the improved features. If so, the dynamic dependency function 68 returns a dependency identifier that identifies the file 52 so such executable can obtain the benefits of the improved features. If not, the dynamic dependency function 68 returns a dependency identifier that identifies the file 54. Notably, this is completely transparent to the executable file that invoked the shared object "RTD2.SO".

Figure 4:
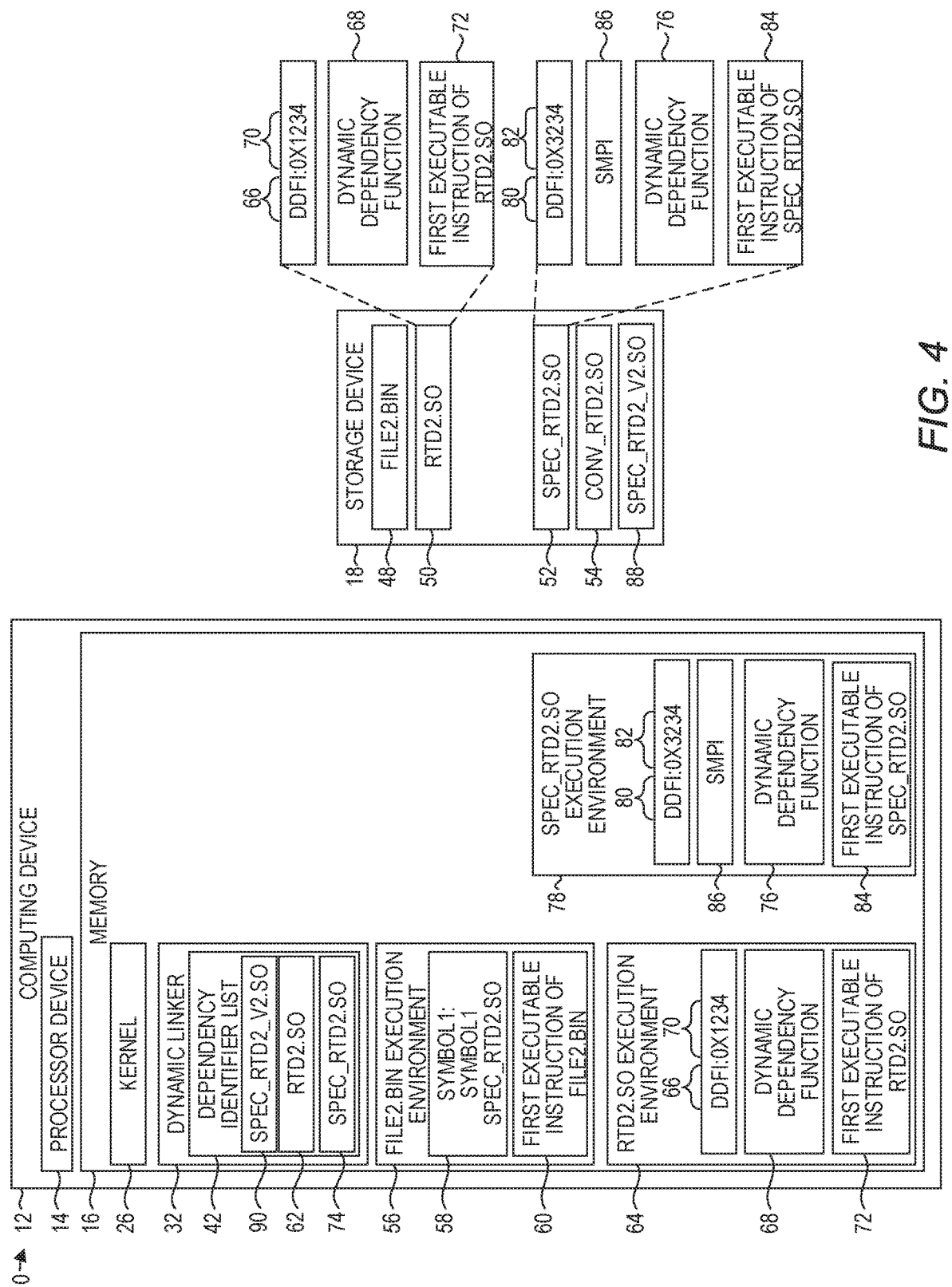
FIG. 4 is a block diagram of the environment illustrated in FIGS. 1 and 3A-3B according to additional implementations.

FIG. 4 is a block diagram of the environment 10 according to additional implementations. In this example, assume that the processing described above with regard to FIG. 3B has occurred with respect to the file 50, except in this example, the file 52 also contains a dynamic dependency function 76. Thus, after adding the dependency identifier 74 of the file 52 to the dependency identifier list 42, the dynamic linker 32 loads the file 52 to load symbols of the file 52 for subsequent symbol matching. An execution environment 78 is generated for the file 52, and some or all of the contents of the file 52 are copied into the execution environment 78. In this example, the execution environment 78 includes a DDFI 80 that indicates the presence of the dynamic dependency function 76. The file 52 also includes a dynamic dependency function address 82, which identifies a location of the dynamic dependency function 76, and the file 52 executable instructions 84 that include a first executable instruction that the processor device 14 will execute after the initiation stage of the file 52 completes. In this implementation, the file 52 includes a symbol matching priority indicator (SMPI) 86 which indicates to the dynamic linker 32 that the dependencies returned by the dynamic dependency function 76 are to be given a highest symbol matching priority.

During the initiation stage of the file 52, the dynamic linker 32 determines, based on the DDFI 80, that the file 52 contains the dynamic dependency function 76. The dynamic linker 32 allocates a quantity of memory for use by the dynamic dependency function 76. The dynamic linker 32 also obtains certain environment information and invokes the dynamic dependency function 76. The dynamic linker 32 provides a pointer to an initial address of the quantity of allocated memory and a pointer to the environment information.

Based on one or more items of environment information, the dynamic dependency function 76 determines to return a dependency identifier that identifies a file 88. The dynamic dependency function 76 copies the identifier of the file 88 into the allocated memory via the pointer and terminates.

The dynamic linker 32 accesses the allocated memory and adds a dependency identifier 90 to the dependency identifier list 42 that identifies the dependency (SPEC_RTD2_V2.SO). The dynamic linker 32 adds the dependency identifier 90 to the top of the dependency identifier list 42 so that, during the symbol matching stage, the file 88 will be searched for matching symbols prior to the files 50 and 52. Because the dynamic linker 32 resolves unresolved symbols to the first match, if each of the files 50, 52, and 88 contain the same symbol that matches an unresolved symbol of the file 48, the unresolved symbol will be matched to the symbol in the file 88 rather than to the symbol in the file 50 or 52. In this manner, a dynamic dependency function can identify a dependency and indicate that the dependency has a higher symbol-matching priority than previously identified dependencies and thus, in essence, cause the identified dependency to override any matching symbols defined in such previously identified dependencies.

Figure 5:
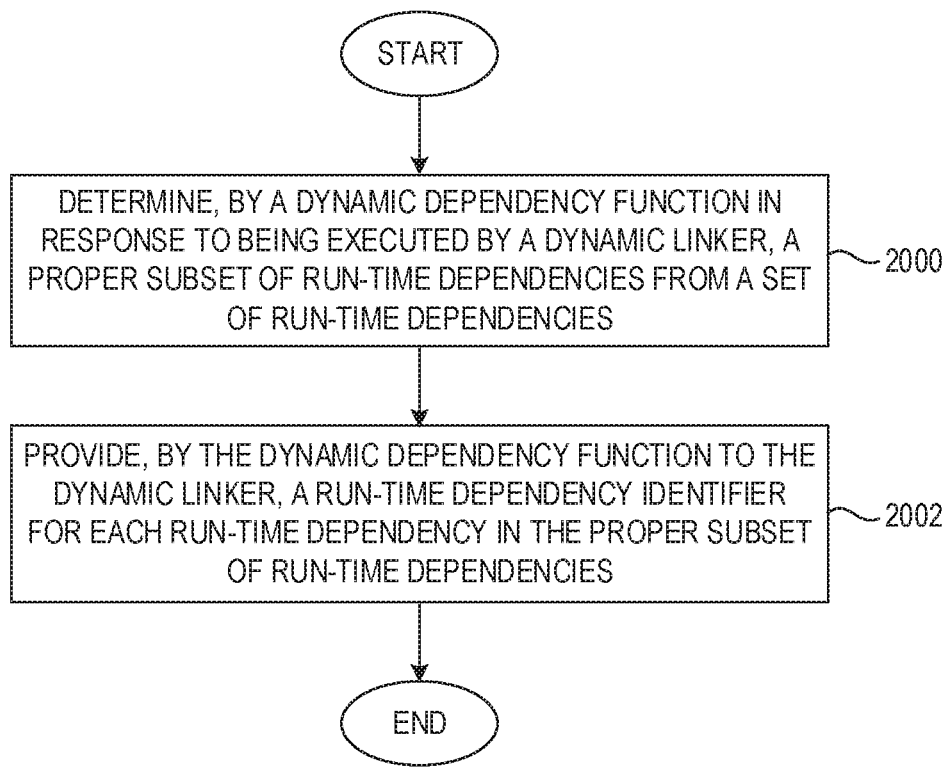
FIG. 5 is a flowchart of a method for returning, by a dynamic dependency function, a dependency identifier to a dynamic linker according to one example.

FIG. 5 is a flowchart of a method for returning, by a dynamic dependency function, a dependency identifier to a dynamic linker according to one example. FIG. 5 will be discussed in conjunction with FIG. 1. The dynamic dependency function 36, in response to being executed by the dynamic linker 32, determines a proper subset of run-time dependencies 22 from the set of run-time dependencies 22, 24 (FIG. 5, block 2000). The dynamic dependency function 36 provides, to the dynamic linker 32, a run-time dependency identifier for each run-time dependency in the proper subset of run-time dependencies 22 (FIG. 5, block 2002).

Figure 6:
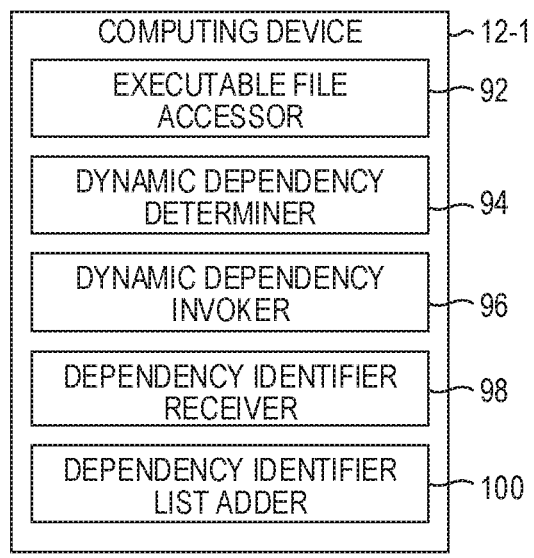
FIG. 6 is a block diagram of a computing device suitable for implementing aspects illustrated in FIG. 1 according to one implementation.

FIG. 6 is a block diagram of a computing device 12-1 according to another implementation. The computing device 12-1 implements identical functionality as that described above with regard to the computing device 12. The computing device 12-1 includes an executable file accessor 92 that is configured to access the contents of an executable file. The contents may be on a storage device, such as the storage device 18, or may be in the memory 16. The executable file accessor 92 may comprise executable software instructions configured to program a processor device to implement the functionality of accessing contents of a first executable file that is to be executed, may comprise circuitry including, by way of non-limiting example, an application-specific integrated circuit (ASIC), field-programmable gate array (FPGA), or may comprise a combination of executable software instructions and circuitry.

The computing device 12-1 also includes a dynamic dependency determiner 94 that is configured to, based on the contents of the first executable file, determine that the first executable file includes a first dynamic dependency function configured to be executed by a dynamic linker. As discussed above, in some implementations this may be via a DDFI or identification of some other attribute or characteristic of the contents of the first executable file that indicates the presence of the first dynamic dependency function. The dynamic dependency determiner 94 may comprise executable software instructions configured to program a processor device to implement the functionality of determining that the first executable file includes a first dynamic dependency function configured to be executed by a dynamic linker, may comprise circuitry including, by way of non-limiting example, an ASIC, FPGA, or may comprise a combination of executable software instructions and circuitry.

The computing device 12-1 also includes a dynamic dependency invoker 96 that is configured to invoke the first dynamic dependency function of the first executable file. The dynamic dependency invoker 96 may invoke the first dynamic dependency function in accordance with the mechanisms of a corresponding operating system for invoking modules of executable code. The dynamic dependency invoker 96 may comprise executable software instructions to program a processor device to implement the functionality of invoking the first dynamic dependency function of the first executable file, may comprise circuitry including, by way of non-limiting example, an ASIC, FPGA, or may comprise a combination of executable software instructions and circuitry.

The computing device 12-1 also includes a dependency identifier receiver 98 configured to receive, from the first dynamic dependency function, a first run-time dependency identifier that identifies a first run-time dependency. The dependency identifier receiver 98 may receive the first run-time dependency identifier via any suitable interprocess communication mechanism, such as via function parameters, or, as discussed above, by providing to the first dynamic dependency function a pointer to memory allocated by a dynamic linker. The dependency identifier receiver 98 may comprise executable software instructions to program a processor device to implement the functionality of receiving, from the first dynamic dependency function, a first run-time dependency identifier that identifies a first run-time dependency, may comprise circuitry including, by way of non-limiting example, an ASIC, FPGA, or may comprise a combination of executable software instructions and circuitry.

The computing device 12-1 also includes a dependency identifier list adder 100 that is configured to add the first run-time dependency identifier to a dependency identifier. The dependency identifier list adder 100 may comprise executable software instructions configured to implement the functionality of adding the first run-time dependency identifier to a dependency identifier, may comprise circuitry including, by way of non-limiting example, an ASIC, FPGA, or may comprise a combination of executable software instructions and circuitry.

Figure 7:
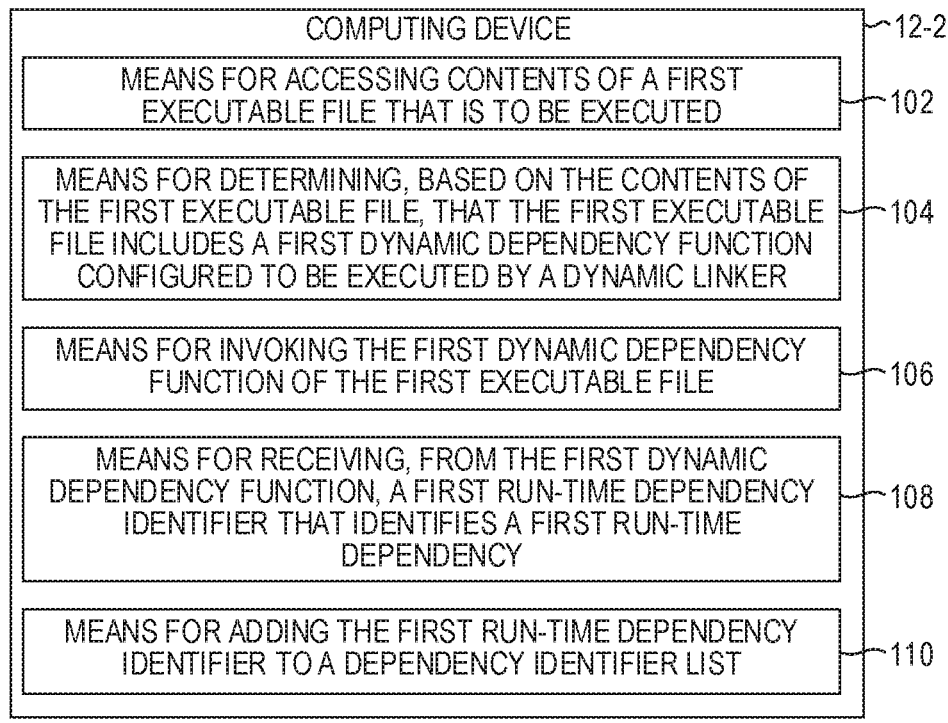
FIG. 7 is a block diagram of a computing device suitable for implementing aspects illustrated in FIG. 1 according to additional implementations.

FIG. 7 is a block diagram of a computing device 12-2 according to additional implementations. The computing device 12-2 implements identical functionality as that described above with regard to the computing device 12. In this implementation, the computing device 12-2 includes a means 102 for accessing contents of a first executable file that is to be executed. The means 102 may be implemented in any number of manners, including, for example, via the executable file accessor 92 illustrated in FIG. 6.

The computing device 12-2 also includes a means 104 for determining, based on the contents of the first executable file, that the first executable file includes a first dynamic dependency function configured to be executed by a dynamic linker. The means 104 may be implemented in any number of manners, including, for example, via the dynamic dependency determiner 94 illustrated in FIG. 6.

The computing device 12-2 also includes a means 106 for invoking the first dynamic dependency function of the first executable file. The means 106 may be implemented in any number of manners, including, for example, via the dynamic dependency invoker 96 illustrated in FIG. 6.

The computing device 12-2 also includes a means 108 for receiving, from the first dynamic dependency function, a first run-time dependency identifier that identifies a first run-time dependency. The means 108 may be implemented in any number of manners, including, for example, via the dependency identifier receiver 98 illustrated in FIG. 6.

The computing device 12-2 also includes a means 110 for adding the first run-time dependency identifier to a dependency identifier list. The means 110 may be implemented in any number of manners, including, for example, via the dependency identifier list adder 100 illustrated in FIG. 6.

Figure 8:
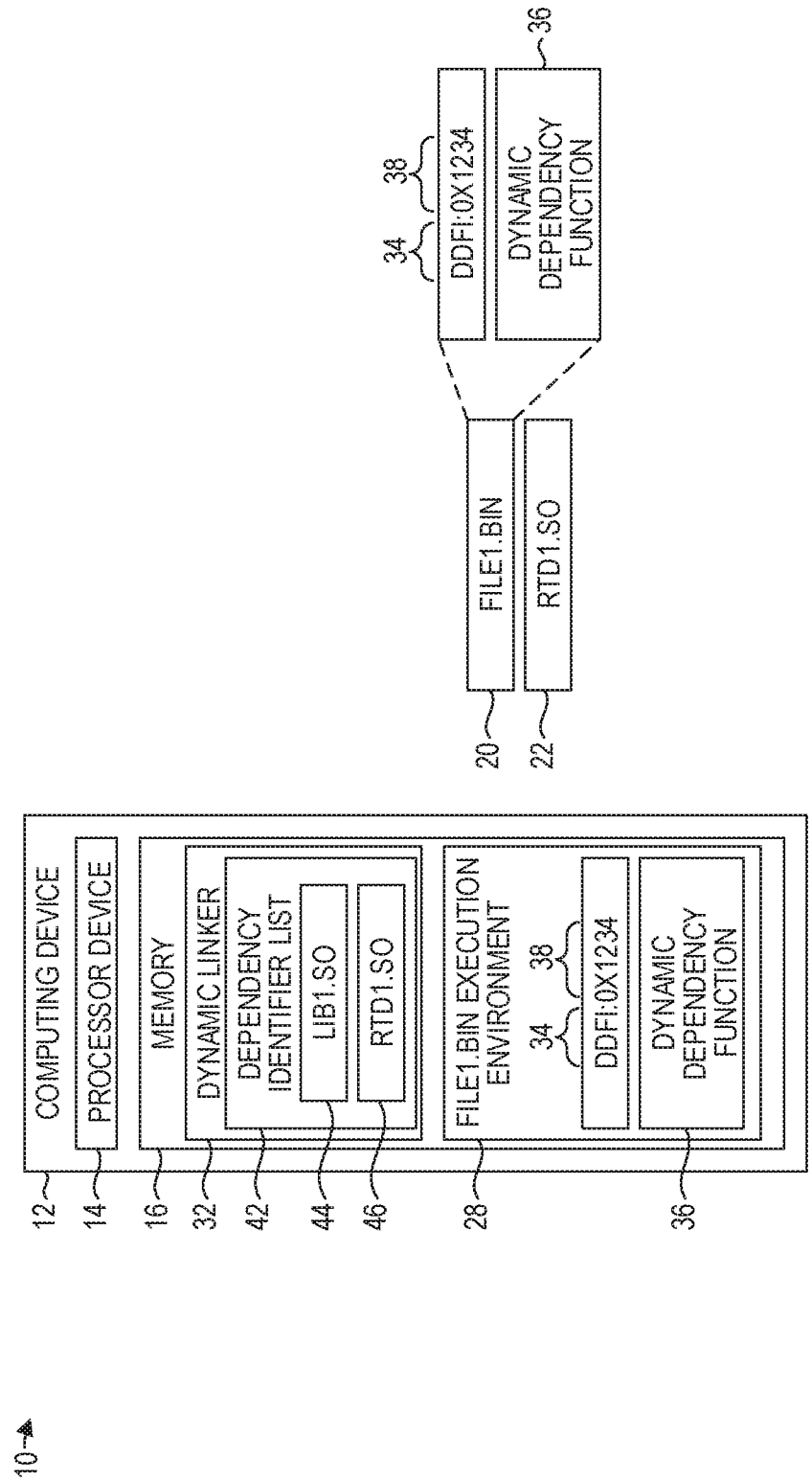
FIG. 8 is a simplified block diagram of the environment illustrated in FIG. 1.

FIG. 8 is a simplified block diagram of the environment 10. The computing device 12 includes the memory 16 and the processor device 14 coupled to the memory 16. The processor device 14 is to access, via the dynamic linker 32, the executable file 20 that is to be executed. The processor device 14 is further to determine, via the dynamic linker 32, based on the executable file 20, that the executable file 20 includes the dynamic dependency function 36. The processor device 14 is further to invoke, by the dynamic linker 32, the dynamic dependency function 36. The processor device 14 is further to receive, via the dynamic linker 32 from the dynamic dependency function 36, the run-time dependency identifier 46 that identifies the run-time dependency, and to add the run-time dependency identifier 46 to the dependency identifier list 42.

Figure 9:
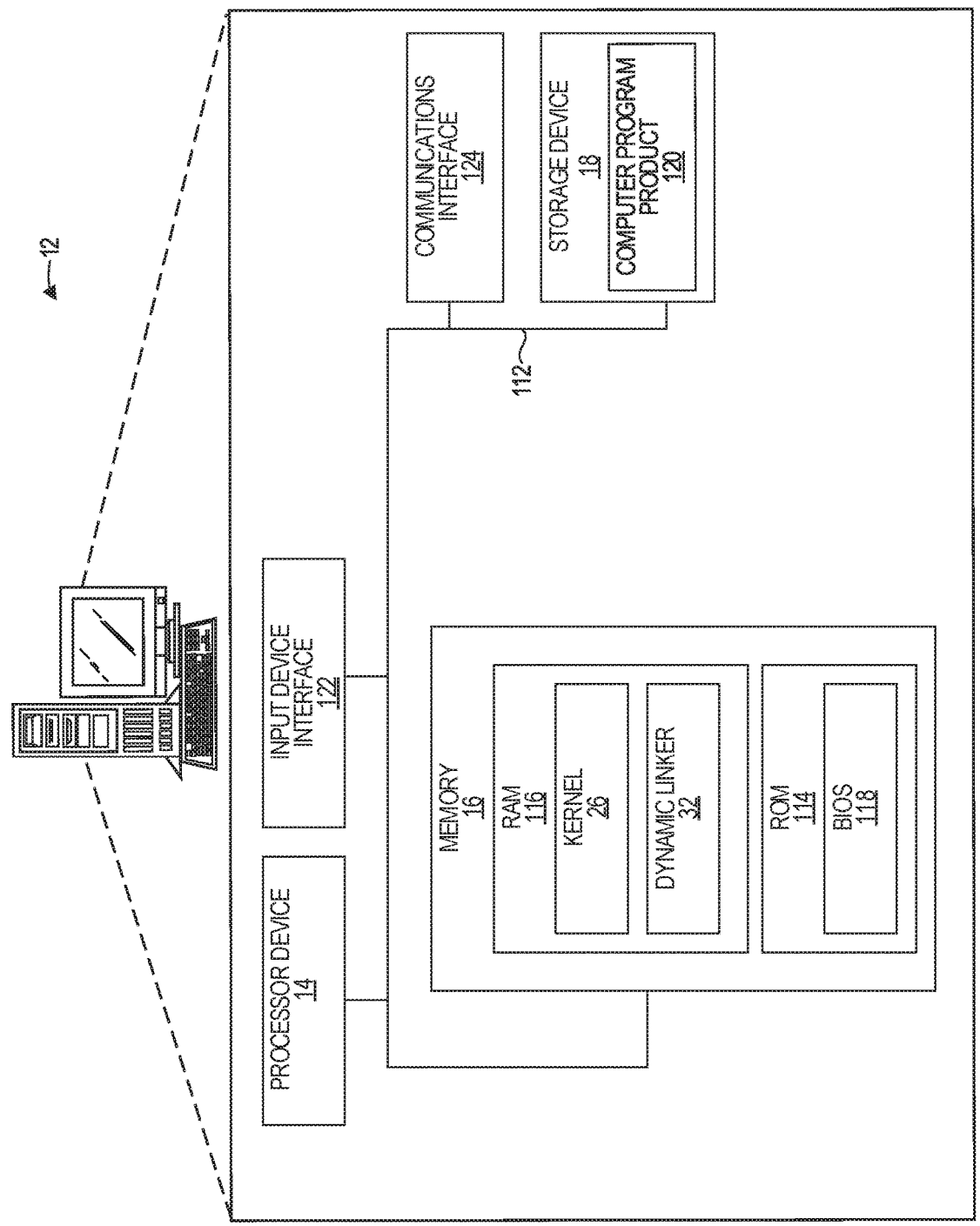
FIG. 9 is a block diagram of a computing device suitable for implementing examples according to one example.

FIG. 9 is a block diagram of the computing device 12 suitable for implementing examples according to one example. The computing device 12 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 12 includes the processor device 14, the system memory 16, and a system bus 112. The system bus 112 provides an interface for system components including, but not limited to, the system memory 16 and the processor device 14. The processor device 14 can be any commercially available or proprietary processor, such as, by way of non-limiting example, an Intel® or AMD® processor device.

The system bus 112 may be any of several types of bus structures that may further interconnect to a memory bus (with or without a memory controller), a peripheral bus, and/or a local bus using any of a variety of commercially available bus architectures. The system memory 16 may include non-volatile memory 114 (e.g., read-only memory (ROM), erasable programmable read-only memory (EPROM), electrically erasable programmable read-only memory (EEPROM), etc.), and volatile memory 116 (e.g., random-access memory (RAM)). A basic input/output system (BIOS) 118 may be stored in the non-volatile memory 114 and can include the basic routines that help to transfer information between elements within the computing device 12. The volatile memory 116 may also include a high-speed RAM, such as static RAM, for caching data.

The computing device 12 may further include or be coupled to a non-transitory computer-readable storage medium such as the storage device 18, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 18 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 18 and in the volatile memory 116, including an operating system, such as the kernel 26, and one or more program modules, such as the dynamic linker 32, which may implement the functionality described herein in whole or in part. It is to be appreciated that the examples can be implemented with various commercially available operating systems or combinations of operating systems.

All or a portion of the examples may be implemented as a computer program product 120 stored on a transitory or non-transitory computer-usable or computer-readable storage medium, such as the storage device 18, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14. The processor device 14, in conjunction with the dynamic linker 32 in the volatile memory 116, may serve as a controller, or control system, for the computing device 12 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 14 through an input device interface 122 that is coupled to the system bus 112 but can be connected by other interfaces such as a parallel port, an Institute of Electrical and Electronic Engineers (IEEE) 1394 serial port, a Universal Serial Bus (USB) port, an IR interface, and the like. The computing device 12 may also include a communications interface 124, such as, for example, an Ethernet transceiver, suitable for communicating with a network as appropriate or desired.

Other computer system designs and configurations may also be suitable to implement the systems and methods described herein. The following examples illustrate various additional implementations in accordance with one or more aspects of the disclosure.

Example 1 is a computing device comprising an executable file accessor to access the contents of an executable file; a dynamic dependency determiner to, based on the contents of the first executable file, determine that the first executable file includes a first dynamic dependency function configured to be executed by a dynamic linker; a dynamic dependency invoker to invoke the first dynamic dependency function of the first executable file; a dependency identifier receiver to receive, from the first dynamic dependency function, a first run-time dependency identifier that identifies a first run-time dependency; and a dependency identifier list adder to add the first run-time dependency identifier to a dependency identifier.

Example 2 is a computing device comprising a means for accessing contents of a first executable file that is to be executed; a means for determining, based on the contents of the first executable file, that the first executable file includes a first dynamic dependency function configured to be executed by a dynamic linker; a means for invoking the first dynamic dependency function of the first executable file; a means for receiving, from the first dynamic dependency function, a first run-time dependency identifier that identifies a first run-time dependency; and a means for adding the first run-time dependency identifier to a dependency identifier list.

Example 3 is a method comprising accessing, by a dynamic linker executing on a computing device comprising a processor device, a first executable file that is to be executed; determining, by the dynamic linker, based on contents of the first executable file, that the first executable file includes a first dependency identifier that identifies a first dependency required by the first executable file; adding the first dependency identifier to a dependency identifier list;

determining, by the dynamic linker, based on the contents of the first executable file, that the first executable file includes a first dynamic dependency function configured to be executed by the dynamic linker; invoking, by the dynamic linker, the first dynamic dependency function of the first executable file; receiving, by the dynamic linker from the first dynamic dependency function, a second dependency identifier that identifies a second dependency required by the first executable file; and adding the second dependency identifier to the dependency identifier list.

Example 4 is the method of example 3 wherein invoking, by the dynamic linker, the first dynamic dependency function of the first executable file further comprises transferring control of the processor device from the dynamic linker to the first dynamic dependency function.

Example 5 is the method of example 3 further comprising loading, by the dynamic linker, the second dependency into memory.

Example 6 is a method comprising determining, by a dynamic dependency function in response to being executed by a dynamic linker, a proper subset of run-time dependencies from a set of run-time dependencies; and providing, by the dynamic dependency function to the dynamic linker, at least one run-time dependency identifier that identifies the proper subset of run-time dependencies.

Example 7 is the method of example 6 further comprising receiving, by the dynamic dependency function from the dynamic linker, a pointer to a memory address allocated by the dynamic linker; and wherein providing the at least one run-time dependency identifier that identifies the proper subset of run-time dependencies comprises storing, via the pointer, the at least one run-time dependency identifier.

Example 8 is the method of example 6 further comprising receiving, by the dynamic dependency function from the dynamic linker, environment information that identifies attributes of a computing device environment on which the dynamic dependency function is executing; and wherein determining, by the dynamic dependency function, the proper subset of run-time dependencies from the set of run-time dependencies comprises determining, by the dynamic dependency function, the proper subset of run-time dependencies from the set of run-time dependencies based at least in part on the environment information.

Example 9 is the method of example 8 wherein the environment information comprises a processor identifier that identifies a processor manufacturer of the processor device of the computing device environment.

Example 10 is the method of example 8 wherein the environment information comprises a processor model identifier that identifies a processor model of the processor device of the computing device environment.

Example 11 is the method of example 6 wherein the set of run-time dependencies comprises a first shared library and a second shared library; and wherein the dynamic dependency function provides the first shared library or the second shared library based on at least one criterion.

Example 12 is the method of example 11 wherein the at least one criterion comprises a characteristic of a processor device that is executing the dynamic dependency function.

Example 13 is the method of example 6 further comprising receiving, by the dynamic dependency function from the dynamic linker, a pointer to a memory address allocated by the dynamic linker; determining, by the dynamic dependency function, that an amount of memory allocated by the dynamic linker is an insufficient amount of memory; and notifying the dynamic linker that the amount of memory allocated by the dynamic linker is an insufficient amount of memory.

Example 14 is a computing device comprising a memory; and a processor device coupled to the memory; wherein the processor device is to determine, via a dynamic dependency function in response to being executed by a dynamic linker, a proper subset of run-time dependencies from a set of run-time dependencies; and provide, via the dynamic dependency function to the dynamic linker, at least one run-time dependency identifier that identifies the proper subset of run-time dependencies.

Example 15 is a computing device comprising means for determining, via a dynamic dependency function in response to being executed by a dynamic linker, a proper subset of run-time dependencies from a set of run-time dependencies; and means for providing, via the dynamic dependency function to the dynamic linker, at least one run-time dependency identifier that identifies the proper subset of run-time dependencies.

Example 16 is an executable file comprising a dynamic dependency function; and a dynamic dependency function indicator that indicates a presence of the dynamic dependency function.

Individuals will recognize improvements and modifications to the preferred examples of the disclosure. All such improvements and modifications are considered within the scope of the concepts disclosed herein and the claims that follow.

What is claimed is:

1. A method comprising:
   accessing, by a dynamic linker executing on a computing device comprising a processor device, contents of an executable file that is to be executed;
   determining, by the dynamic linker, based on the contents of the executable file, that the executable file includes a first dynamic dependency function configured to be executed by the dynamic linker;
   invoking, by the dynamic linker, the first dynamic dependency function of the executable file;
   receiving, by the dynamic linker from the first dynamic dependency function, a first run-time dependency identifier that identifies a first run-time dependency; and
   adding the first run-time dependency identifier to a dependency identifier list prioritizing dependencies providing a higher symbol-matching priority to map an unresolved symbol in the executable file to the first run-time dependency to override a previously identified run-time dependency in the dependency identifier list.

2. The method of claim 1 wherein the first run-time dependency comprises a shared library.

3. The method of claim 2 wherein the executable file comprises a shared library.

4. The method of claim 3 further comprising:
   identifying, by the dynamic linker, an unresolved symbol in the executable file;
   identifying, by the dynamic linker, a symbol in the first run-time dependency that matches the unresolved symbol; and
   mapping, by the dynamic linker, the unresolved symbol to the symbol in the first run-time dependency.

5. The method of claim 1 wherein determining that the executable file includes the first dynamic dependency function configured to be executed by the dynamic linker comprises identifying, by the dynamic linker, data in the contents of the executable file comprising a dynamic dependency function indicator that indicates the executable file includes the first dynamic dependency function.

6. The method of claim 1 wherein the executable file comprises an Executable Linkable Format (ELF) file.

7. The method of claim 1 further comprising identifying, in an execution environment into which contents of the executable file have been loaded, an address pointer that identifies a location of the first dynamic dependency function.

8. The method of claim 1 further comprising:
obtaining, by the dynamic linker, environment information, the environment information comprising processor device information that identifies characteristics of the processor device; and
providing, by the dynamic linker to the first dynamic dependency function, the environment information.

9. The method of claim 8 wherein the environment information comprises one or more of a process auxiliary vector of the executable file or a process environment vector of the executable file.

10. The method of claim 1 further comprising:
allocating, by the dynamic linker, a first quantity of memory; and
providing, by the dynamic linker to the first dynamic dependency function, a pointer to an initial address of the first quantity of memory.

11. The method of claim 10 wherein receiving, by the dynamic linker from the first dynamic dependency function, the first run-time dependency identifier that identifies the first run-time dependency comprises obtaining, from the first quantity of memory, the first run-time dependency identifier.

12. The method of claim 10 further comprising:
receiving, by the dynamic linker from the first dynamic dependency function, an indication that the first quantity of memory is insufficient;
allocating, by the dynamic linker, a second quantity of memory that is larger than the first quantity of memory; and
providing, by the dynamic linker to the first dynamic dependency function, a pointer to an initial address of the second quantity of memory.

13. The method of claim 1 further comprising:
allocating, by the dynamic linker, a quantity of memory;
obtaining, by the dynamic linker, environment information, the environment information comprising a processor device identifier; and
providing, by the dynamic linker to the first dynamic dependency function, the environment information and a pointer to an initial address of the quantity of memory.

14. The method of claim 1 further comprising:
accessing, by the dynamic linker, a first run-time dependency executable file that corresponds to the first run-time dependency;
determining, by the dynamic linker, based on contents of the first run-time dependency executable file, that the first run-time dependency executable file includes a second dynamic dependency function configured to be executed by the dynamic linker;
invoking, by the dynamic linker, the second dynamic dependency function of the first run-time dependency executable file;
receiving, by the dynamic linker from the second dynamic dependency function, a second run-time dependency identifier that identifies a second run-time dependency; and adding the second run-time dependency identifier to the dependency identifier list.

15. The method of claim 14 further comprising:
identifying, by the dynamic linker, an unresolved symbol in the executable file;
identifying, by the dynamic linker, a symbol in the second run-time dependency that matches the unresolved symbol; and
mapping, by the dynamic linker, the unresolved symbol to the symbol in the second run-time dependency.

16. The method of claim 14 wherein adding the second run-time dependency identifier to the dependency identifier list further comprises:
adding the second run-time dependency identifier to the dependency identifier list providing a higher symbol-matching priority to the second run-time dependency than the first run-time dependency;
identifying, by the dynamic linker, an unresolved symbol in the executable file, wherein the first run-time dependency and the second run-time dependency each have a symbol that matches the unresolved symbol;
identifying, by the dynamic linker, a symbol in the second run-time dependency that matches the unresolved symbol; and
mapping, by the dynamic linker, the unresolved symbol to the symbol in the second run-time dependency.

17. The method of claim 1 wherein the executable file comprises an ELF file, and wherein determining, by the dynamic linker, based on contents of the executable file, that the executable file includes the first dynamic dependency function configured to be executed by the dynamic linker comprises:
accessing a PT_DYNAMIC element in a program header table of the executable file;
accessing, based on the PT_DYNAMIC element, a dynamic segment of the executable file; and
identifying, in the dynamic segment, a tag that indicates that the executable file includes the first dynamic dependency function configured to be executed by the dynamic linker.

18. The method of claim 1 further comprising:
transferring control, by the dynamic linker to the processor device, to an entry point of the executable file that identifies a first executable instruction of the executable file.

19. A computing device, comprising:
a memory; and
a processor device coupled to the memory to:
access, by a dynamic linker, an executable file that is to be executed;
determine, by the dynamic linker, based on the executable file, that the executable file includes a dynamic dependency function;
invoke, by the dynamic linker, the dynamic dependency function;
receive, by the dynamic linker from the dynamic dependency function, a run-time dependency identifier that identifies a run-time dependency; and
add the run-time dependency identifier to a dependency identifier list providing a higher symbol-matching priority to the run-time dependency identifier than a previously identified run-time dependency in the dependency identifier list, the higher symbol-matching priority prioritizing mapping an unresolved symbol in the executable file to a matching symbol in the first run-time dependency to override a matching symbol in the previously identified run-time dependency.

20. A non-transitory computer-readable storage medium that includes executable instructions to cause a processor device to:
- access, by a dynamic linker, an executable file that is to be executed;
- determine, by the dynamic linker, that the executable file includes a dynamic dependency function;
- invoke, by the dynamic linker, the dynamic dependency function;
- receive, by the dynamic linker from the dynamic dependency function, a first run-time dependency identifier that identifies a first run-time dependency;
- add the first run-time dependency identifier to a dependency identifier list;
- add a second run-time dependency identifier to the dependency identifier list providing a higher symbol-matching priority to the second run-time dependency than the first run-time dependency; and
- map, by the dynamic linker, an unresolved symbol in the executable file to a symbol in the second run-time dependency to override a matching symbol in the first run-time dependency.

* * * * *